United States Patent
Curtis et al.

(12)

(10) Patent No.: US 6,348,983 B1
(45) Date of Patent: Feb. 19, 2002

(54) HOLOGRAPHIC STORAGE MEDIUM HAVING ENHANCED TEMPERATURE OPERATING RANGE AND METHOD OF MANUFACTURING THE SAME

(75) Inventors: Kevin R. Curtis; Lisa Dhar, both of New Providence; Melinda G. Schnoes, South Amboy, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/589,948

(22) Filed: Jun. 8, 2000

(51) Int. Cl.[7] .............................. G03H 1/02; G03H 1/12; G03H 1/26; G11C 13/04
(52) U.S. Cl. ................... 359/3; 359/7; 359/11; 359/22; 359/27; 359/35; 365/125
(58) Field of Search ............................ 359/3, 7, 22, 35, 359/10, 11, 27; 365/125

(56) References Cited

U.S. PATENT DOCUMENTS 5,519,517 A * 5/1996 Redfield et al. ............... 359/22

FOREIGN PATENT DOCUMENTS

JP       05165388 A * 7/1993 ..................... 359/3

OTHER PUBLICATIONS

Demetri Psaltis and Fai Mok, "Holographic Memories," Scientific American, New York, Nov. 1995, pp. 70–77.

Lisa Dhar, Melinda G. Schnoes, Theresa L. Wysocki, Harvey Bair, Marcia Schilling, and Carol Boyd, Bell Laboratories, Lucent Technologies, Murray Hill, New Jersey, "Temperature–induced Changes In Photopolymer Volume Holograms," 1998 American Institute of Physics, Appl. Phys. Letter, vol. 73, No. 10, Sep. 7, 1998.

Lisa Dhar, Arturo Hale, Howard E. Katz, Marcia L. Schilling, Melinda G. Schnoes, and Fred C. Schilling, Bell Laboratories, Lucent Technologies, Murray Hill, New Jersey, "Recording Meda That Exhibit High Dynamic Range For Digital Holographic Data Storage," 1999 Optical Society of America, Optics Letters, vol. 24, No. 7, Apr. 1, 1999.

* cited by examiner

Primary Examiner—Audrey Chang

(57) ABSTRACT

A holographic storage medium, a method of manufacturing the holographic storage medium and a holographic storage device incorporating the storage medium. In one embodiment, the holographic storage medium includes: (1) first and second spaced-apart substrates, the first substrate being plastic and (2) a photopolymer core located between said first and second substrates and having a coefficient of thermal expansion such that said first and second substrates and said photopolymer core cooperate to respond substantially isotropically to a change in temperature.

12 Claims, 3 Drawing Sheets

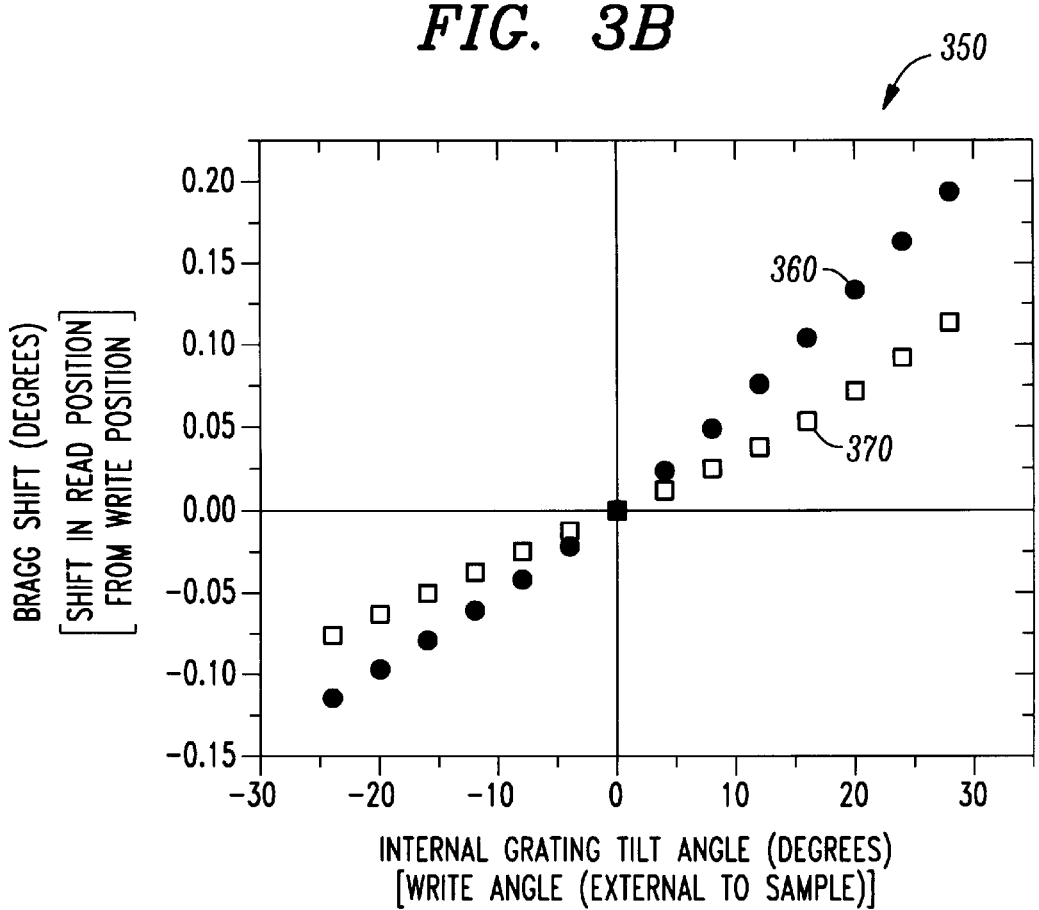
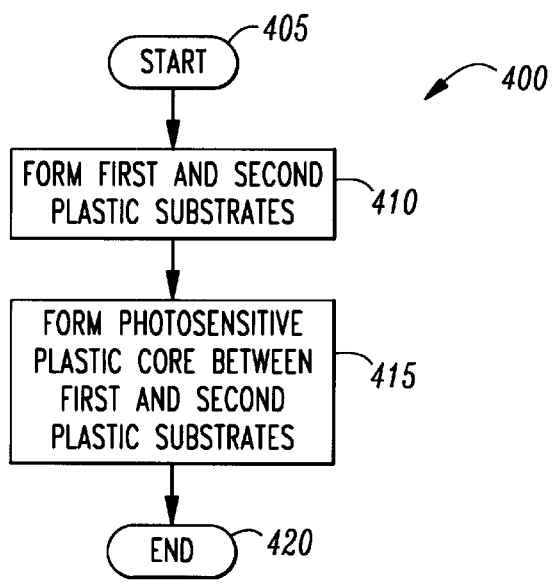

HOLOGRAPHIC STORAGE MEDIUM HAVING ENHANCED TEMPERATURE OPERATING RANGE AND METHOD OF MANUFACTURING THE SAME

TECHNICAL FIELD OF THE INVENTION

The present invention is directed, in general, to a storage device and, more specifically, to a system and method of holographic storage having an enhanced temperature operating range.

BACKGROUND OF THE INVENTION

The technologies supporting the development of enhanced information systems is a major area of focus. Optical storage of data has been one of the bright spots in these technologies over the past several years. For example, compact discs dominate the market for musical recordings and are now also the standard medium for multimedia releases, which may combine text, images and sound. A compact disc can hold about 640 megabytes that can accommodate 300,000 pages of doubled-spaced typewritten text or one and a quarter hour of high-fidelity music. However, developers of information storage devices continue to seek increased storage capacity.

As part of this development, page-wise memory systems employing holographic storage have been suggested as an alternative to conventional memory devices. Page-wise memory systems that store a page of data involve the storage and readout of an entire two-dimensional representation. Typically, recording or "writing" light passes through a two-dimensional array of dark and transparent areas representing data. Then, the holographic system stores the data in three dimensions where the holographic representations of the pages occur as patterns of varying refractive index imprinted into a storage medium. The holographic data storage typically consists of a distribution of gratings having varying tilt angles with separations proportional to periods caused by the angular bandwidth of the data pages that are recorded. Additionally, reconstructive or "reading" light is diffracted at a well-defined angle of incidence (the Bragg angle) with respect to the gratings. Background information concerning holographic systems is discussed in Holographic Memories, by D. Psaltis, et al., Scientific American, November (1995) and incorporated herein by reference.

Photopolymer materials are considered attractive recording media candidates for high density holographic data storage. They are low in cost, are easily processed and can be designed to have large index contrasts with high photosensitivity. This class of materials can be fabricated with the dynamic range, media thickness, optical quality and dimensional stability required for high density applications. This are discussed in "Recordinq Media That Exhibit High Dynamic Range for Holographic Storage", by Lisa Dhar et. al., Optics Letters, Volume 24, P.487 (1999) and incorporated herein by reference. An area of disadvantage for these materials is their fairly large coefficients of thermal expansion, which produces a dimensional change in the material-with changes in temperature.

Polymer materials for holographic recording are typically sandwiched between two substrates to insure high optical quality. Currently, glass substrates are used to sandwich the polymer material. The dimensional changes caused by temperature variations of the polymer in glass substrates exhibit anisotropic behavior in that the variations occur mainly in the thickness (perpendicular to the plane of the substrates) direction. This occurs because the polymer material is constrained by the rigid substrates in the lateral (parallel to the plane of the substrates) direction and only allowed to displace in the thickness direction. This anisotropic temperature response produces a negative effect on the fidelity of data recovery that is about three times greater than the effect of an isotropic temperature response. This behavior seriously restricts the acceptable operating temperature range of the material's use as a holographic data storage medium. Background information concerning anisotropic temperature effects are discussed in "Temperature-Induced Changes in Photopolymer Volume Holograms", by Lisa Dhar, et al.,Applied Physics Letter, Volume 73 No. 10, 1337 (1998) and incorporated herein by reference.

Accordingly, what is needed in the art is a way to diminish the effects of temperature variation on stored holographic information.

SUMMARY OF THE INVENTION

To address the above-discussed deficiencies of the prior art, the present invention provides a holographic storage medium, a method of manufacturing the holographic storage medium and a holographic storage device incorporating the storage medium. In one embodiment, the holographic storage medium includes: (1) first and second spaced-apart substrates, the first substrate being plastic and (2) a photopolymer core located between the first and second substrates and having a coefficient of thermal expansion such that the first and second substrates and the photopolymer core cooperate to respond substantially isotropically to a change in temperature.

The present invention recognizes that dimensional stability in at least one of the substrates of a holographic storage medium is not necessarily desirable; rather, mechanical compatibility between the core and the at least one substrate is more important in that material expansion can become isotropic and therefore of less optical effect. This results in a broader operating temperature range for the medium and greater writing and reading reliability.

For purposes of the present invention, the term "respond substantially isotropically" means that the expansion does not exceed the operating limits for Bragg Angle Shifts for the material used to construct the holographic storage medium. One skilled in the pertinent art is familiar with Bragg Angle Shifts. Alternatively, although the response may not be substantially isotropic, the degree of anisotropicity is such that an enhanced operating temperature range is maintained without incurring unacceptable writing or reading errors. The effects described above are noted for single holograms as well as holograms that are multiplexed in a volume using any current or future developed multiplexing techniques. For example, angle multiplexing, wavelength multiplexing, phase correlation multiplexing, aperture multiplexing, shift multiplexing and phase code multiplexing.

Additionally, photopolymer cores may include nonphotoactive materials as well as photoactive monomer systems. Photoactive monomer systems are systems that include monomers that will polymerize on the incidence of light. Photoactive monomer systems are used in photopolymers that use polymerization as a mechanism of recording and are well known to one skilled in the pertinent art.

In one embodiment of the present invention, the coefficient of thermal expansion of the photopolymer core ranges from about 50% to about 500% of a coefficient of thermal expansion of the first substrate. In a related embodiment, the coefficient of thermal expansion of the photopolymer core further ranges from about 50% to about 500% of a coefficient of thermal expansion of the second substrate.

In one embodiment of the present invention, the second substrate is plastic. In an embodiment to be illustrated and described, the second substrate comprises the same material and is of the same lateral dimension as the first substrate, although this certainly need not be the case. In other embodiments of the present invention, the materials making up the first and second substrates may be different or the same.

In one embodiment of the present invention, optical effects of the coefficient of thermal expansion of the photopolymer core are wavelength-depended. In another embodiment of the present invention, optical effects of the coefficient of thermal expansion of the photopolymer core can be compensated by tuning the wavelength of the readout laser. This allows a tunable laser to be employed further to compensate for optical variations caused by thermal expansion or contraction.

In one embodiment of the present invention, a fraction of photopolymer core is a photoactive monomer system. In another embodiment of the present invention, the entire photopolymer core is a photoactive monomer system.

In one embodiment of the present invention, exposure to light polymerizes the photopolymer core or a fraction of the photopolymer core. However, other chemical or structural changes within the core signifying the presence, degree or absence of an interaction are within the broad scope of the present invention.

In one embodiment of the present invention, the present invention provides a holographic storage device that includes: (1) coherent light source, (2) a holographic multiplexing mechanism that causes changes in an interaction between an object beam and a reference beam derived from said coherent light source and (3) a holographic storage medium that receives and stores interference patterns resulting from said interaction and including: (A) first and second spaced-apart substrates, said first and second substrates being plastic, and (B) a photopolymer core located between said first and second substrates and having a coefficient of thermal expansion such that said first and second substrates and said photopolymer core cooperate to respond substantially isotropically to a change in temperature.

For purposes of the present invention, the term "causes changes in an interaction" means that the holographic multiplexing mechanism can cause a change in the period or phase of grading in the interaction. Of course, however, other types of changes to the interaction are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 3B illustrates a graph showing experimental temperature responses for two holographic storage mediums; and FIG. 4 illustrates a flow diagram of an embodiment of a method of manufacturing a holographic storage medium constructed according to the principles of the present invention.

DETAILED DESCRIPTION

Figure 1A:
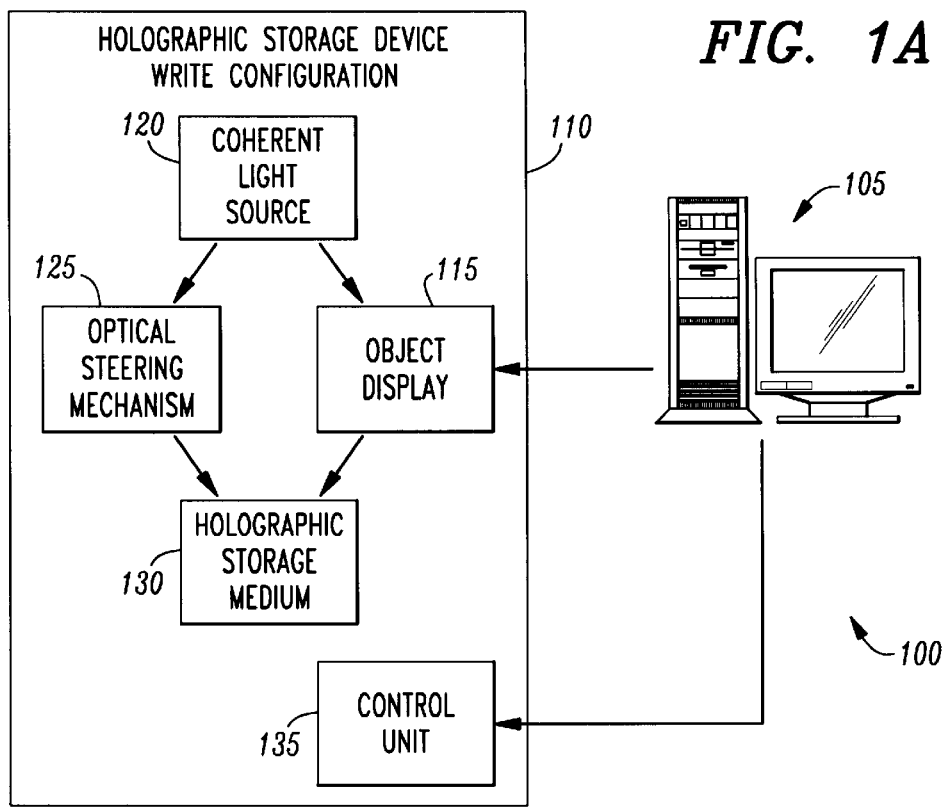
FIG. 1A illustrates a block diagram of an embodiment of a holographic storage system employing angle multiplexing configured to create and capture holographic images constructed according to the principles of the present invention.

Referring initially to FIG. 1A, illustrated is a block diagram of an embodiment of a holographic storage system employing angle multiplexing , generally designated 100, configured to create and capture holographic images constructed according to the principles of the present invention. Although the illustrated embodiment employs angle multiplexing, other embodiments may employ other holographic multiplexing schemes or mechanisms such as wavelength multiplexing, phase correlation multiplexing, aperture multiplexing, shift multiplexing and phase code multiplexing as well as future developed techniques are well within the broad scope of the present invention.

The system 100 includes a conventional computer 105 and a holographic storage device 110 having an enhanced temperature operating range. The holographic storage device 110 includes an object display 115, a coherent light source 120, a conventional optical steering mechanism 125, a holographic storage medium 130 and a control unit 135. FIG. 1A illustrates the holographic storage device 110 configured to store or write holographic images of an object presented on the object display 115 to the holographic storage medium 130.

In the illustrated embodiment, the object display 115 is coupled to the computer 105 and receives the digital information to be stored on the holographic storage medium 130. The digital data stream of bits is arranged into arrays or data pages and presented to the system using the object display 115. In one embodiment, the object display 115 is a liquid-crystal display ("LCD") screen which presents ones or zeros by patterns of transmitting or opaque squares, to be stored or written to the holographic storage medium 130. In other embodiments, the object display 115 can be any spatial-light modulator. One skilled in the pertinent art is familiar with and the use of spatial-light modulators. The modulated beam from the spatial-light modulator may be imaged, Fourier transformed or relayed to the holographic storage medium 130 using optical elements well known to one skilled in the pertinent art.

The coherent light source 120 is a laser, which may be tunable in wavelength, that is directed to the optical steering mechanism 125. The optical steering mechanism 125, a holographic multiplexing mechanism for angle multiplexing, changes the angle of incidence of the beam onto the holographic storage medium 130. Each hologram that is multiplexed at the same location in the holographic storage medium 130 is stored at a different angle. The holographic storage medium 130 receives and stores interference patterns resulting from the interaction between the object beam from the object display 115 and the reference beam from the optical steering mechanism 125.

The control unit 135 is also coupled to the computer 105 and directs the operation of the holographic storage device 110 by coordinating all aspects of the writing light, the object to be scanned, management of the holographic image generated and positioning of the storage medium. One skilled in the pertinent art is familiar with and the use of tunable lasers. Background information concerning holographic systems is discussed in Holographic Memories, by D. Psaltis, et al., Scientific American, November (1995) and incorporated herein by reference.

In one embodiment, the holographic storage medium 130 includes first and second spaced-apart plastic substrates and a photopolymer core. (See FIG. 2 for a more detailed description of the holographic storage medium). The photopolymer core is located between the first and second substrates and has a coefficient of thermal expansion that is appropriately matched to a coefficient of thermal expansion of the first and second substrates. Appropriately matching the coefficients of thermal expansion allows the holographic storage medium 130 to respond substantially isotropically to changes in operating temperature. A substantially isotropic change in the holographic storage medium 130 allows the stored holographic images to be recovered with acceptable fidelity over an extended operating temperature range. This range is extended by the fact that the isotropic change is smaller than the anisotropic change. In addition, an isotropic change, expansion or shrinkage, can be compensated for by changing the read-out wavelength.

Figure 1B:
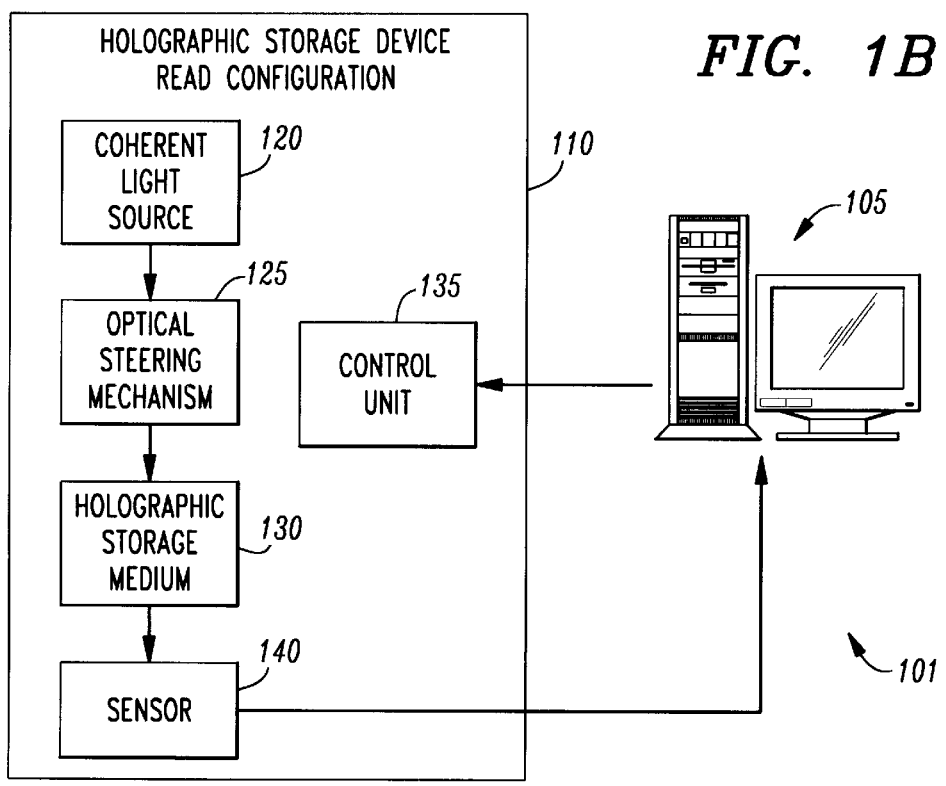
FIG. 1B illustrates a block diagram of an embodiment of a holographic storage system configured to recreate and recover holographic data pages stored in a holographic storage medium constructed according to the principles of the present invention.

Turning now to FIG. 1B, illustrated is a block diagram of an embodiment of a holographic storage system, generally designated 101, configured to recreate and recover holographic data pages stored in the holographic storage medium 130 constructed according to the principles of the present invention. The system 101 includes the computer 105 and the holographic storage device 110 having an enhanced temperature operating range. The holographic storage device 110 includes the coherent light source 120, the optical steering mechanism 125, the holographic storage medium 130, a sensor 140 and the control unit 135.

The holographic storage device 110 is configured to read the holographic images of data pages stored in the holographic storage medium 130. The coherent light source 120 is a laser, which may be tunable in wavelength, that supplies a reading light to the holographic storage medium 130 through the optical steering mechanism 125. The reading light interacts with or diffracts off of the dielectric modulation stored in the holographic storage medium 130 to reconstruct the digital data pages. The different data pages are addressed by changing the angle of the reference beam using the optical steering mechanism 125. The reconstructed digital data pages are imaged onto the sensor 140 with all bits in the data page detected simultaneously. One skilled in the pertinent art is familiar with the use of sensor arrays or detector units such as the sensor 140 in holographic storage systems.

The sensor 140 then sends the recreated holographic data page to the computer 105 for further processing. Typically, error correction codes and channel modulation codes are used to recover the digital data. The control unit 135, also coupled to the computer 105, coordinates all aspects of reading the stored holographic data pages for the holographic storage device 110, such as tuning the wavelength of the coherent light source 120 and controlling the optical steering mechanism 125. Background information concerning reconstructing holographic images in a holographic system is discussed in Holographic Memories, by D. Psaltis, et al., Scientific American, November (1995) and incorporated herein by reference.

Figure 2:
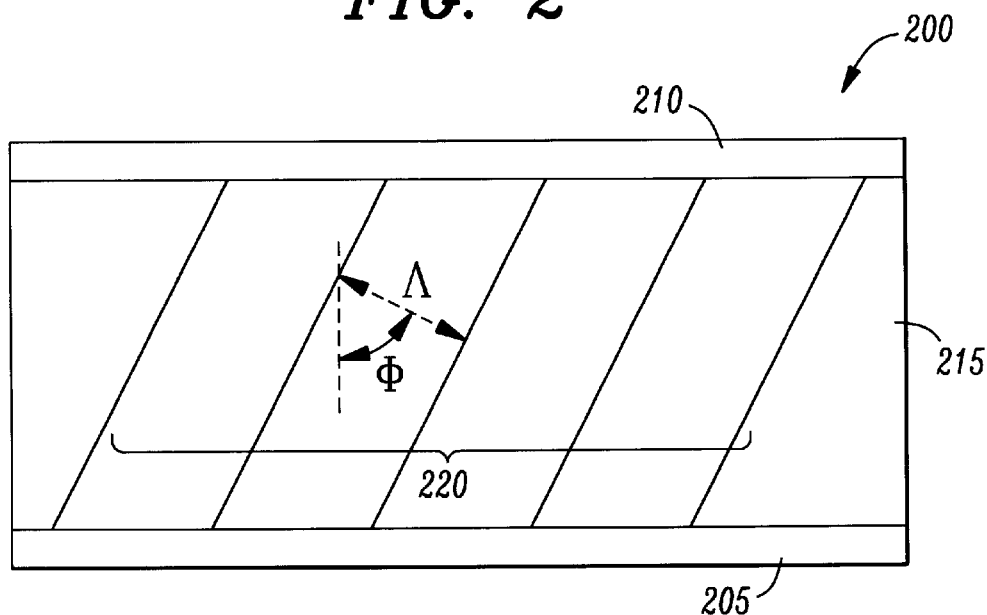
FIG. 2 illustrates a diagram of an embodiment of a holographic storage medium used in the holographic storage device of FIG. 1.

Turning now to FIG. 2, illustrated is a diagram of an embodiment of a holographic storage medium 200 used in the holographic storage device 110 of FIGS. 1A and 1B. The holographic storage medium 200 includes first and second substrates 205, 210 that are spaced-apart and a photopolymer core 215 that is positioned between the substrates. The photopolymer core 215 includes an optical interference pattern 220 written during a holographic recording.

In the illustrated embodiment, exposing the photopolymer core 215 to light polymerizes the photopolymer core 215. Additionally, the first and second substrates 205, 210 and the photopolymer core 215 cooperate to respond substantially isotropically to a change in temperature.

In another embodiment, the photopolymer core 215 has a coefficient of thermal expansion that ranges from about 50 percent to about 500 percent of a coefficient of thermal expansion of the first substrate 205. In a related embodiment, the coefficient of thermal expansion of the photopolymer core 215 further ranges from about 50 percent to about 500 percent of a coefficient of thermal expansion of the second substrate 210.

In the illustrated embodiment, a fraction of the photopolymer core 215 is a photoactive monomer system. In an alternative embodiment, the presence, degree or absence of an interaction within the core of the holographic storage medium 200 may be represented by other chemical or structural changes, which may be used to represent or signify the optical interference pattern 220.

FIG. 2 further illustrates several typical characteristics of the optical interference pattern 220 whose readout characteristics are temperature dependent. The optical interference pattern 220 is characterized by a grating period $\Lambda$, as shown in FIG. 2, and a tilt angle $\Phi$ that indicates the deviation from vertical that the optical interference pattern 220 exhibits. Additionally, a Bragg Angle shift $\Delta\Theta_B$ indicates a shift in the direction required by incident reading light from the original recording position to achieve Bragg matching. For further reference see "Temperature-induced changes in photopolymer volume holograms", by Lisa Dhar et. al., Applied Physics letters, Volume 73, No. 10, p 1337 (1998) and incorporated herein by reference. One skilled in the pertinent art is familiar with grating periods, tilt angles, Bragg matching and Bragg Angle shifts.

An anisotropic temperature response greatly restricts the temperature range over which these parameters may vary and retain acceptable fidelity of recreated objects. Alternatively, a substantially isotropic temperature response, as shown in the illustrated embodiment of the present invention, decreases the Bragg shift required. This characteristic therefore retains an acceptable fidelity of the recreated object over an enhanced temperature range.

Additionally, although the temperature response of the holographic storage medium 200 may not be substantially isotropic, the degree of anisotropicity may be such that an enhanced operating temperature range is maintained without incurring unacceptable writing or reading errors. In the illustrated embodiment, optical effects of the coefficient of thermal expansion of the photopolymer core 215 can be counteracted by changing the wavelength of the laser. This allows a tunable laser to be advantageously employed as the coherent light source 120 of FIGS. 1A and 1B to further compensate for optical variations caused by thermal expansion or contraction. Changing the wavelength of the laser, however, will cause a change in the optical magnification that was present at recording or writing. This change in magnification can be appropriately modified to reconstruct the original magnification of the data page to be detected.

In general, the first and second substrates 205, 210 may comprise the same material or different materials. In the illustrated embodiment, the second substrate 210 comprises the same material as the first substrate 205, which is plastic. Additionally, the second substrate 210 is of the same lateral dimension as the first substrate 205, although this certainly need not be the case.

Figure 3A:
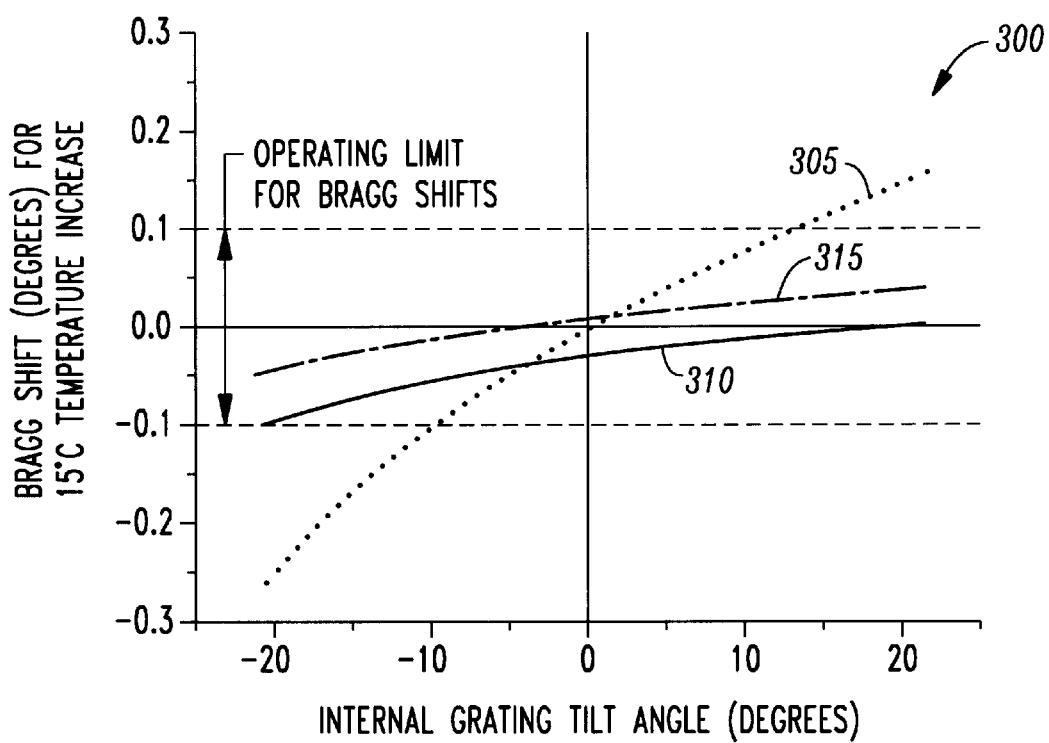
FIG. 3A illustrates a graph showing theoretical temperature responses for different types of holographic storage mediums.

Turning now to FIG. 3A, illustrated is a graph 300 showing theoretical temperature responses for different types of holographic storage mediums. The graph 300 includes first, second and third curves 305, 310, 315. The first curve 305 illustrates a temperature response for a holographic storage medium that employs a photosensitive core positioned between two glass substrates. This structure produces an unacceptable anisotropic response to temperature variations. The first curve 305 indicates that the Bragg Angle shift is well outside an indicated acceptable operating range of 0.2 degrees for a 15 degree Centigrade temperature increase. This degree of Bragg Angle shift distorts fidelity to an unacceptable level when employing a reading light to recreate an object from storage.

The second curve 310 illustrates a temperature response for the holographic storage medium 200 of FIG. 2. Here the photopolymer core 215 and the first and second substrates 205, 210 yield a temperature response that is substantially isotropic. In the illustrated embodiment, the holographic storage medium 200 has a substantially isotropic response that produces a Bragg Angle shift of about 0.1 degrees for the same temperature increase of 15 degrees Centigrade. This Bragg Angle shift is about half of the acceptable overall operating range. However, the shift is seen to occur over the bottom half of the acceptable range, thereby effectively reducing the acceptable range.

The third curve 315 illustrates a temperature response for the holographic storage medium 200 of FIG. 2 when wavelength tuning is employed. Wavelength tuning of the reading light effectively repositions the second curve 310 to the center of the acceptable operating range, as shown. This capability to reposition or tune the temperature response is seen to actually extend the temperature range of acceptable fidelity for recreating objects from storage.

One skilled in the art should know that the present invention is not limited to a Bragg Angle shift of about 0.1 degrees or any other absolute value. Nor is the present invention required to use wavelength tuning. Other embodiments may use the same or different types of photosensitive cores and produce different Bragg Angle shifts that result in a broader operating temperature range and greater writing and reading reliability.

Turning now to FIG. 3B, illustrated is a graph 350 showing experimental temperature responses for two holographic storage mediums. The graph 350 includes first and second curves 360, 370. The first curve 360 illustrates a temperature response for a holographic storage medium that employs a photopolymer layer of 250 micrometer thickness that is encased between two glass substrates of one millimeter thickness. The second curve 370 illustrates a temperature response for a holographic storage medium that employs a photopolymer layer of 250 micrometer thickness that is encased between two polycarbonate substrates of 500 micrometer thickness.

The shift in Bragg detuning levels were measured at a temperature of about 6.7 degrees centigrade above the temperature during recording of the holograms. It may be observed that the shift range for the photopolymer encased in plastic substrates (the second curve 370) is about a factor of two less than the shift range of the photopolymer material encased in glass substrates (the first curve 360). Details of an experiment may be found in "Temperature-induced changes in photopolymer volume holograms", by Lisa Dhar et. al., Applied Physics letters, Volume 73, No. 10, p 1337 (1998), referenced earlier, which used a similar experimental setup that was used to obtain the data of FIG. 3B.

Turning now to FIG. 4, illustrated is a flow diagram of an embodiment of a method 400 of manufacturing a holographic storage medium constructed according to the principles of the present invention. The method 400 starts with the selection of an acceptable plastic for use as first and second substrates in a step 405. The step 405 also includes the selection of an appropriate photopolymer for use as a core. In one embodiment, the step 405 further includes selecting the photopolymer core that has a coefficient of thermal expansion such that the first and second substrates and the photopolymer core cooperate to respond substantially isotropically to a change in temperature. In a second embodiment, the photopolymer core has a coefficient of thermal expansion that ranges from about 50 percent to about 500 percent of the coefficient of thermal expansion of the first substrate. In a third embodiment, the photopolymer core further has a coefficient of thermal expansion that ranges from about 50 percent to about 500 percent of the coefficient of thermal expansion of the second substrate.

In a step 410, the first and second plastic substrates are formed having an appropriate thickness and shape for the intended holographic storage medium and holographic storage device. The photopolymer core is then formed between the two substrates in a step 415. The method 400 ends in a step 420 wherein the holographic storage medium is appropriately tested and packaged.

One skilled in the art should know that the present invention is not limited to manufacturing process described above. Other embodiments of the present invention may use other manufacturing processes and may have additional or fewer steps than described above.

In summary, the present invention recognizes that dimensional stability in at least one of the substrates of a holographic storage medium is not necessarily desirable; rather, mechanical compatibility between the core and the at least one substrate is more important in that material expansion can become substantially isotropic and therefore of less optical effect. This results in a broader operating temperature range for the medium and greater writing and reading reliability. The operating temperature range may be typically further extended through the use of wavelength tuning of at least the reading light.

Although the present invention has been described in detail, those skilled in the art should understand that they can make various changes, substitutions and alterations herein without departing from the spirit and scope of the invention in its broadest form.

What is claimed is:

1. A holographic storage device, comprising:

a coherent light source;

a holographic multiplexing mechanism that causes an interaction between an object beam and a reference beam derived from said coherent light source; and a holographic storage medium that receives and stores interference patterns resulting from said interaction and including:

first and second spaced-apart substrates, said first and second substrates being plastic, and a photopolymer core located between said first and second substrates and having a coefficient of thermal expansion such that said first and second substrates and said photopolymer core cooperate to respond substantially isotropically to a change in temperature, wherein optical effects of thermal expansion of said photopolymer core are compensated by tuning a wavelength of said coherent light source.

2. The holographic storage device as recited in claim 1 wherein said coefficient of thermal expansion of said photopolymer core ranges from about 50% to about 500% of a coefficient of thermal expansion of said first and second substrates.

3. The holographic storage device as recited in claim 1 wherein said coherent light source produces a read light that interacts with said interference pattern to reproduce said interaction.

4. The holographic storage device as recited in claim 3 wherein said holographic multiplexing mechanism further causes said read light to interact with said interference pattern.

5. The holographic storage device as recited in claim 1 wherein a fraction of said photopolymer core is a photoactive monomer system.

6. The holographic storage device as recited in claim 1 wherein said holographic multiplexing mechanism is one selected from the group consisting of:

an angle multiplexing, a wavelength multiplexing, a phase correlation multiplexing, an aperture multiplexing, a shift multiplexing, and a phase code multiplexing.

7. A holographic storage device, comprising:

a coherent light source;

a holographic multiplexing mechanism that causes an interaction between an object beam and a reference beam derived from said coherent light source; and a holographic storage medium that receives and stores interference patterns resulting from said interaction and including:

first and second spaced-apart substrates, said first and second substrates being plastic, and a photopolymer core located between said first and second substrates and having a coefficient of thermal expansion such that said first and second substrates and said photopolymer core cooperate to respond substantially isotropically to a change in temperature, wherein optical effects of thermal expansion of said photopolymer core are compensated by tuning a wavelength of said coherent light source and by changing an optical magnification in response to said tuning of said wavelength.

8. The holographic storage device as recited in claim 7 wherein said coefficient of thermal expansion of said photopolymer core ranges from about 50% to about 500% of a coefficient of thermal expansion of said first and second substrates.

9. The holographic storage device as recited in claim 7 wherein said coherent light source produces a read light that interacts with said interference pattern to reproduce said interaction.

10. The holographic storage device as recited in claim 9 wherein said holographic multiplexing mechanism further causes said read light to interact with said interference pattern.

11. The holographic storage device as recited in claim 7 wherein a fraction of said photopolymer core is a photoactive monomer system.

12. The holographic storage device as recited in claim 7 wherein said holographic multiplexing mechanism is one selected from the group consisting of:

an angle multiplexing, a wavelength multiplexing, a phase correlation multiplexing, an aperture multiplexing, a shift multiplexing, and a phase code multiplexing.

* * * * *